(12) United States Patent
Diachina et al.

(10) Patent No.: US 9,148,824 B2
(45) Date of Patent: Sep. 29, 2015

(54) METHODS AND APPARATUS FOR CONTROLLING CIRCUIT SWITCHED FALL BACK OF A MOBILE STATION FROM E-UTRAN TO UTRAN/GERAN IN A FULL-MULTI-OPERATOR CORE NETWORK

(71) Applicant: TELEFONAKTIEBOLAGET L M ERICSSON (PUBL), Stockholm (SE)

(72) Inventors: John Walter Diachina, Garner, NC (US); Paul Schliwa-Bertling, Ljungsbro (SE); Anders Molander, Linkoping (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 139 days.

(21) Appl. No.: 13/712,495

(22) Filed: Dec. 12, 2012

(65) Prior Publication Data
US 2013/0163560 A1 Jun. 27, 2013

Related U.S. Application Data

(60) Provisional application No. 61/578,499, filed on Dec. 21, 2011.

(51) Int. Cl.
*H04B 7/00* (2006.01)
*H04W 36/00* (2009.01)

(52) U.S. Cl.
CPC .......... *H04W 36/00* (2013.01); *H04W 36/0022* (2013.01)

(58) Field of Classification Search
None
See application file for complete search history.

(56) References Cited

U.S. PATENT DOCUMENTS

| | | | |
|---|---|---|---|
| 2005/0215253 A1* | 9/2005 | Johannesson et al. | 455/435.2 |
| 2006/0239229 A1* | 10/2006 | Marinescu et al. | 370/331 |
| 2010/0105380 A1* | 4/2010 | Attar et al. | 455/434 |
| 2010/0297979 A1* | 11/2010 | Watfa et al. | 455/404.1 |
| 2011/0216698 A1* | 9/2011 | Tiwari | 370/328 |

(Continued)

OTHER PUBLICATIONS

Digital cellular telecommunications system (Phase 2+); Universal Mobile Telecommunications System (UMTS); LTE; Circuit Switched (CS) fallback in Evolved Packet System (EPS); Stage 2 (3GPP TS23.272 version 10.5.0 Release 10), Technical Specification, European Telecommunications Standards Institute (ETSI), 650, Route Des Lucioles; F-06921 Sophia-Antipolis ; France, vol. 3GPP SA 2, No. V10.5.0, Oct. 1, 2011, XP014068097.

(Continued)

*Primary Examiner* — Kevin C Harper

(57) ABSTRACT

Packet Switched (PS) handover based Circuit Switched Fall Back (CSFB) of a mobile station is controlled from an Evolved Universal Terrestrial Radio Access Network (E-UTRAN) cell to a target Universal Terrestrial Radio Access Network (UTRAN) cell or a target GSM EDGE Radio Access Network (GERAN) cell in a PS domain. A network node receives a handover request from a SGSN. A PLMN ID associated with the SGSN is identified. A set of PLMN IDs transmitted as system information by the target UTRAN cell or the target GERAN cell is identified. A PLMN ID index is generated to indicate an association between the PLMN ID associated with the SGSN and one of the PLMN IDs of the set. The PLMN ID index is communicated toward the mobile station for use during PS handover based CSFB. The mobile station embeds the PLMN ID index in a Location Area Update (LAU) message, and transmits the LAU message to a target BSS/RNS of the GERAN/UTRAN cell for use during the PS handover based CSFB.

24 Claims, 7 Drawing Sheets

(56) References Cited

U.S. PATENT DOCUMENTS

2013/0107863 A1* 5/2013 Faccin et al. .................. 370/331
2014/0010170 A1* 1/2014 Das et al. ...................... 370/329

OTHER PUBLICATIONS

Alcatel-Lucent: "Discussion on PLMN Identity Indication in CS and PS Domains for GERAN sharing", 3GPP Draft; C1-114418 DISC PLMN-ID IND, 3rd Generation Partnership-Project-(3GPP), Mobile Competence Centre ; 650, Route Des Lucioles ; F-06921 Sophia-Antipolis Cedex; France, vol. CT WG1, no. Hyderabad; 20111010, Oct. 17, 2011, XP050534803, [retrieved on Oct. 17, 2011] the whole document.

Alcatel-Lucent: "Discussion on PLMN Identity Indication for MOCN GERAN network sharing", 3GPP Draft; C1-113605 DISC MOCN PLMN-ID, 3rd Generation Partnership-Project (3GPP), Mobile Competence Centre ; 650, Route Des Lucioles ; F-06921 Sophia-Antipolis Cedex; France, vol. CT WG1, no. Malta; 20110822, Aug. 29, 2011, XP050534087, [retrieved on Aug. 29, 2011]the whole document.

"LTE; General Packet Radio Service (GPRS) enhancements for Evolved Universal Terrestrial Radio Access Network (E-UTRAN) access (3GPP TS 23.401 version 10.5.0 Release 10)", Technical Specification, European Telecommunications Standards Institute (ETSI), 658, Route Des Lucioles; F-06921 Sophia-Antipolis ; France, vol. 3GPP SA 2, No. V10.5.0, Oct. 1, 2811, XP014068101.

3GPP TS 43.129 V10.0.0 (Mar. 2011), 3rd Generation Partnership Project; Technical Specification Group GSM/EDGE Radio Access Network; Packet-switched handover for GERAN A/Gb mode; Stage 2 (Release 9), SP-51, version 10.0.0 available Apr. 2, 2011, the whole document.

* cited by examiner

METHODS AND APPARATUS FOR CONTROLLING CIRCUIT SWITCHED FALL BACK OF A MOBILE STATION FROM E-UTRAN TO UTRAN/GERAN IN A FULL-MULTI-OPERATOR CORE NETWORK

RELATED APPLICATIONS

The present application claims the benefit of priority from U.S. Provisional Application No. 61/578,499 entitled "PLMN ID Index Support for CSFB to MOCN" filed Dec. 21, 2011, the disclosure of which is hereby incorporated herein in its entirety by reference.

TECHNICAL FIELD

The present disclosure relates to radio access networks and, more particularly, to circuit switched fallback in a multi-operator core network.

BACKGROUND

With the introduction of the FULL-Multi-Operator Core Network (FULL-MOCN) feature a common radio access network (RAN, e.g. a BSS) will be shared by multiple Mobile Switching Centres (MSCs) and/or Serving GPRS Support Nodes (SGSNs), where each MSC and/or SGSN is associated with a different Public Land Mobile Network (PLMN) identified using a unique PLMN ID value. When a Mobile Station (MS) is operating in an Evolved Universal Terrestrial Radio Access Network (E-UTRAN) service area and is attached to the UTRAN or GSM EDGE Radio Access Network (GERAN) Circuit Switched (CS) domain, a CS fallback (CSFB) from E-UTRAN access to the UTRAN/GERAN CS domain access may become necessary if the MS cannot initiate an IMS voice session because it is either not IMS registered or IMS voice services are not supported in the E-UTRAN service area. CSFB operations are described in the standards document 3GPP TS (Technical Specification) 23.272. CSFB may be performed using PS Handover to the target UTRAN/GERAN service area (i.e., PS Handover based CSFB is triggered) where the target service area supports FULL-MOCN operation.

PS Handover based CSFB can be used in a scenario wherein the serving E-UTRAN core network may select a target UTRAN/GERAN cell that is associated with a Location Area (LA) which is different from one stored in the MS. Note that a change in LA will typically be experienced for PS handover based CSFB since it involves a change in RAT (radio access technology). Consequently, the MS will initiate a Location Area Update (LAU) procedure upon arrival in the target UTRAN/GERAN cell.

As part of the LAU procedure, the MS transmits a LAU REQUEST message to the target RAN. The target RAN is responsible for forwarding the LAU REQUEST message to the correct Mobile Switching Centre (MSC) based on the PLMN ID that was selected by the serving E-UTRAN core network (during the PS Handover procedure) for use by the MS upon its arrival in the target UTRAN/GERAN service area. Thus, the MSC to which the target RAN forwards the LAU REQUEST message should be the MSC associated with the selected PLMN ID. However, this becomes problematic for PS handover based CSFB to a target cell supporting FULL-MOCN since for this scenario there will be no process for the target RAN to determine the MSC to which it should forward the LAU REQUEST message because it will not be able to associate the MS sending this message with any specific PLMN.

For the non-handover scenario where an MS is able to read system information prior to sending the LAU REQUEST message, the Skip Indicator Information Element included in this message is used to provide the target RAN with the information it needs to determine the MSC to which it is to forward the LAU REQUEST message, i.e., it contains an indication of the selected PLMN ID. Prior to sending a LAU REQUEST message, the MS has knowledge of the set of PLMNs supported by its current serving cell (indicated by system information sent in the serving cell) whenever MOCN operation is supported. Therefore, for the non-handover scenario, the MS is able to use this information to set the value of the Skip Indicator included in the LAU REQUEST message to reflect the desired PLMN ID.

However, for the case of PS Handover based CSFB described above, there is no way for the MS to determine the PLMN selected for it to use in the target cell nor the set of PLMNs supported in the target cell. The MS is therefore unable to populate the Skip Indicator with information that the target RAN needs to use to correctly forward the LAU REQUEST message. With inaccurate/invalid information present within the Skip Indicator there is a high risk that the target RAN will forward the LAU REQUEST message to a MSC that is not associated with the PLMN selected for use by the MS, which may result in the MS receiving less than optimal service. For example, the MS may be billed excessively for all CS calls made while being served by the less preferred PLMN.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

To address the foregoing problems identified in the prior art, the Detailed Description presented hereinafter will describe several systems and methods directed to controlling CSFB of a mobile station from an E-UTRAN serving cell to a target UTRAN cell or a target GERAN cell in a CS domain.

One embodiment is directed to a method in a radio telecommunications network for controlling Packet Switched (PS) handover based CSFB of the mobile station. The method includes receiving a handover request from a SGSN. A PLMN ID associated with the SGSN is identified responsive to the handover request. A set of a plurality of PLMN IDs transmitted as system information by the target UTRAN cell or the target GERAN cell is identified. A PLMN ID index is generated that indicates an association between the PLMN ID associated with the SGSN and one of the PLMN IDs of the set. The PLMN ID index is communicated toward the mobile station for use during the PS handover based CSFB.

The PLMN ID index may be communicated to the mobile station through a handover command message. Upon moving to the target UTRAN cell or the target GERAN cell and completing the PS handover based CSFB, the mobile station establishes a CS connection and determines that a LAU is required. It then embeds the received PLMN ID index in a Location Area Update (LAU) message that it transmits in the target UTRAN cell or target GERAN cell. A target RAN serving the target UTRAN cell or target GERAN cell receives the LAU message and can use the PLMN ID index included therein to identify the MSC that is associated with the PLMN ID index, which can result in the MS receiving improved service.

Another embodiment is directed to a method by a mobile station for controlling PS handover based CSFB of the mobile station from a E-UTRAN serving cell to a target UTRAN cell or a target GERAN cell in a PS domain. An extended service request message is transmitted by the MS to the eNodeB of the E-UTRAN serving cell. A handover command message is received from the eNodeB of the E-UTRAN serving cell responsive to the extended service request message, where the handover command contains a PLMN ID index. The PLMN ID index is embedded in a Location Area Update, LAU, message. The LAU message is transmitted in one of the UTRAN cell or the GERAN cell to which the MS was directed by the handover command message.

As explained above, because the mobile station receives a PLMN ID index as part of the handover command message, it can retain knowledge of this information and is therefore able to include the PLMN ID index in Layer 3 messages sent to the target BSS or target RNS upon establishing a CS connection in the target GERAN cell or target UTRAN cell after completion of the handover execution phase of the PS handover based CSFB procedure. The target BSS or target RNS can thereby identify the MSC that is associated with the PLMN selected for use by the mobile station, which can result in the MS receiving improved service.

Another embodiment is directed to a network node for controlling PS handover based CSFB of a mobile station from an E-UTRAN serving cell to a target UTRAN cell or a target GERAN cell in a PS domain. The network node comprises at least one processor and at least one memory coupled to the at least one processor and comprising computer readable program code that when executed by the at least one processor causes the at least one processor to perform operations that include receiving a handover request from a SGSN, identifying a PLMN ID associated with the SGSN responsive to the handover request, identifying a set of a plurality of PLMN IDs transmitted as system information by the target UTRAN cell or the target GERAN cell, generating a PLMN ID index that indicates an association between the PLMN ID associated with the SGSN and one of the PLMN IDs of the set, and communicating the PLMN ID index toward the mobile station for use during PS handover based CSFB.

Another embodiment is directed to a mobile station for controlling PS handover based CSFB of the mobile station from a E-UTRAN serving cell to a target UTRAN cell or a target GERAN cell in a PS domain. The mobile station comprises at least one processor and at least one memory coupled to the at least one processor and comprising computer readable program code that when executed by the at least one processor causes the at least one processor to perform operations that include transmitting an extended service request message to an eNodeB of the E-UTRAN serving cell, receiving a handover command message from the eNodeB of the E-UTRAN serving cell responsive to the extended service request message, where the handover command contains a PLMN ID index, embedding the PLMN ID index in a LAU message, and transmitting the LAU message in one of the UTRAN cell or the GERAN cell to which the MS was directed by the handover command message.

Other methods, network nodes, and mobile stations according to embodiments of the invention will be or become apparent to one with skill in the art upon review of the following drawings and detailed description. It is intended that all such additional methods, network nodes, and mobile stations be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

The invention will now be described more fully hereinafter with reference to the accompanying drawings, in which embodiments of the invention are shown. The invention may, however, be embodied in many different forms and is not to be construed as limited to the embodiments set forth herein.

Figure 1:
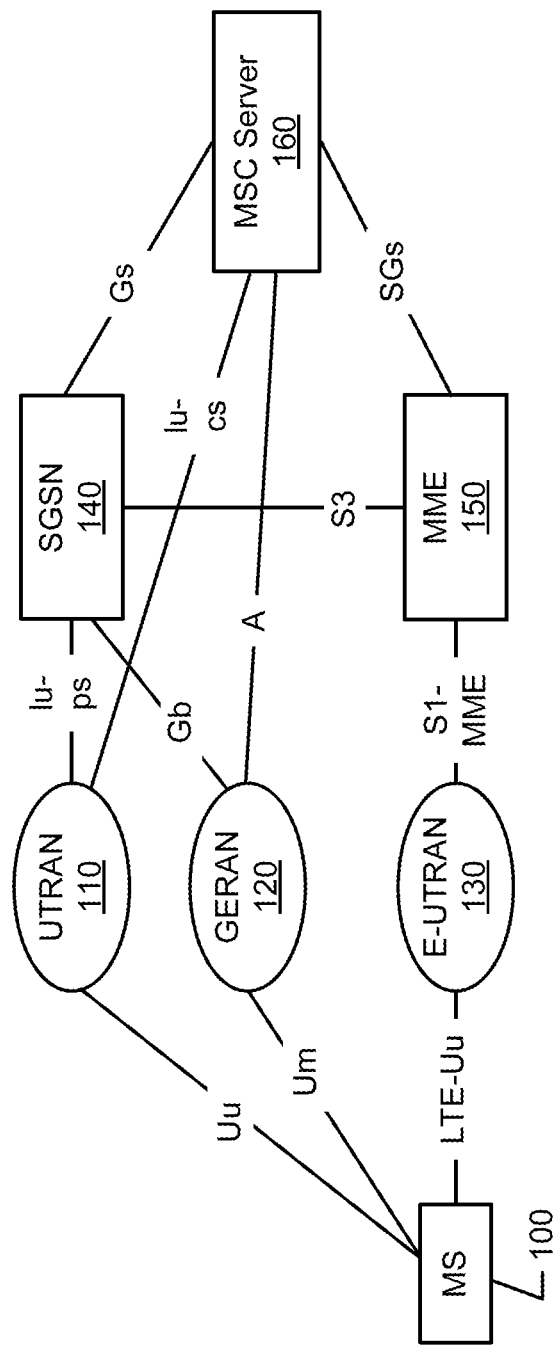
FIG. 1 is a block diagram of a radio telecommunications network that is configured to operate according to some embodiments.

One or more of foregoing problems identified in the prior art may be overcome by various embodiments disclosed herein. Some embodiments are disclosed in the context of an example Third Generation Partnership Project (3GPP) radio telecommunications network shown in FIG. 1 which performs a PS Handover based CSFB procedure that is modified relative to that disclosed in 3GPP TS 23.272. An overview of the network of FIG. 1 is initially provided, and then various operations according to embodiments disclosed herein are explained in the context of the network of FIG. 1. Although various embodiments are disclosed in the context of the network of FIG. 1, the invention is not limited thereto.

The radio telecommunications network comprises a plurality, typically thousands, of mobile stations (MSs) 100 (also known as user equipment nodes, wireless terminals, or mobile stations) that communicate through radio access communication links with a UTRAN 110, a GERAN 120, and/or an E-UTRAN 130.

The UTRAN 110/GERAN 120 can include radio network controller (RNC)/base station controller (BSC) nodes to control communications through radio base station nodes providing radio access communication links to MSs 100 that are within their respective communication service cells. The E-UTRAN 130 can include radio base station nodes (eNodeBs) that can provide the combined functionality of the RNC/BSC nodes of the UTRAN 110/GERAN 120.

A plurality of SGSNs 140 (one of which is shown in FIG. 1) are responsible for the delivery of data packets from and to the MSs 100 within their geographical service area. Their tasks can include packet routing and transfer, mobility management (attach/detach and location management), logical link management, and authentication functions. The SGSNs 140 control communications connections between MSs 100 and one or more packet-based networks, and may perform other functions such as mobility management of MSs 100. Mobility Management Entities (MMEs) 150 (one of which is shown in FIG. 1) and the SGSNs 140 provide control plane functionality to enable mobility of MSs 100 between the UTRAN 110, the GERAN 120, and the E-UTRAN 130 via the S3 interface between the MMEs 150 and the SGSNs 140.

The MMEs 150 route and forward signalling packets for the E-UTRAN 130, and are responsible for EPS Connection Management (ECM) idle mode MS 100 tracking and paging procedures, and are involved in connection bearer (Packet Data Network (PDN) connection) activation/deactivation processes, for choosing a Serving Gateway (SGW) for a MS 100 at the initial attachment and at time of handover.

In one embodiment, one or more network nodes (e.g., base station subsystem (BSS), radio network subsystem (RNS), MME, MSC, SGSN, etc.) of the radio telecommunications network controls Packet Switched (PS) handover based CSFB of a MS 100 from the E-UTRAN serving cell 130 to the target UTRAN cell 110 or the target GERAN cell 120 in a PS domain. A PS handover request is received from the SGSN 140. A Public Land Mobile Network (PLMN) ID associated with the SGSN 140 is identified responsive to the PS handover request. A set of a plurality of PLMN IDs transmitted as system information by the target UTRAN cell 110 or the target GERAN cell 120 is identified. A PLMN ID index is generated that indicates an association between the PLMN ID associated with the SGSN 140 and one of the PLMN IDs of the set.

The PLMN ID index is then communicated toward the MS 100 for use during PS handover based CSFB. The PLMN ID index can be communicated to the MS 100 through a handover command message. Upon moving to the target UTRAN cell 110 or the target GERAN cell 120, completing the handover and establishing a CS connection in the target cell, the MS 100 determines that a Location Area Update, LAU, is needed and embeds the received PLMN ID index in a LAU message that it transmits in the target UTRAN cell 110/target GERAN cell 120 to which the MS 100 was directed by the handover command message. A RNC/BSC of the target UTRAN cell 110/target GERAN cell 120 receiving the LAU message can use the PLMN ID index to identify the MSC 160 that is associated with the PLMN selected for use by the MS 100, which can result in the MS receiving improved service.

These and further operations, methods and associated message flows between various network nodes of the radio telecommunications network are explained below with reference to FIG. 2. Some steps of FIG. 2 may be performed as described in 3GPP TS 23.272 (e.g., FIG. 6.2.1) and as described in 3GPP TS 23.401 (e.g., FIG. 5.5.2.3.3-1).

Figure 2:
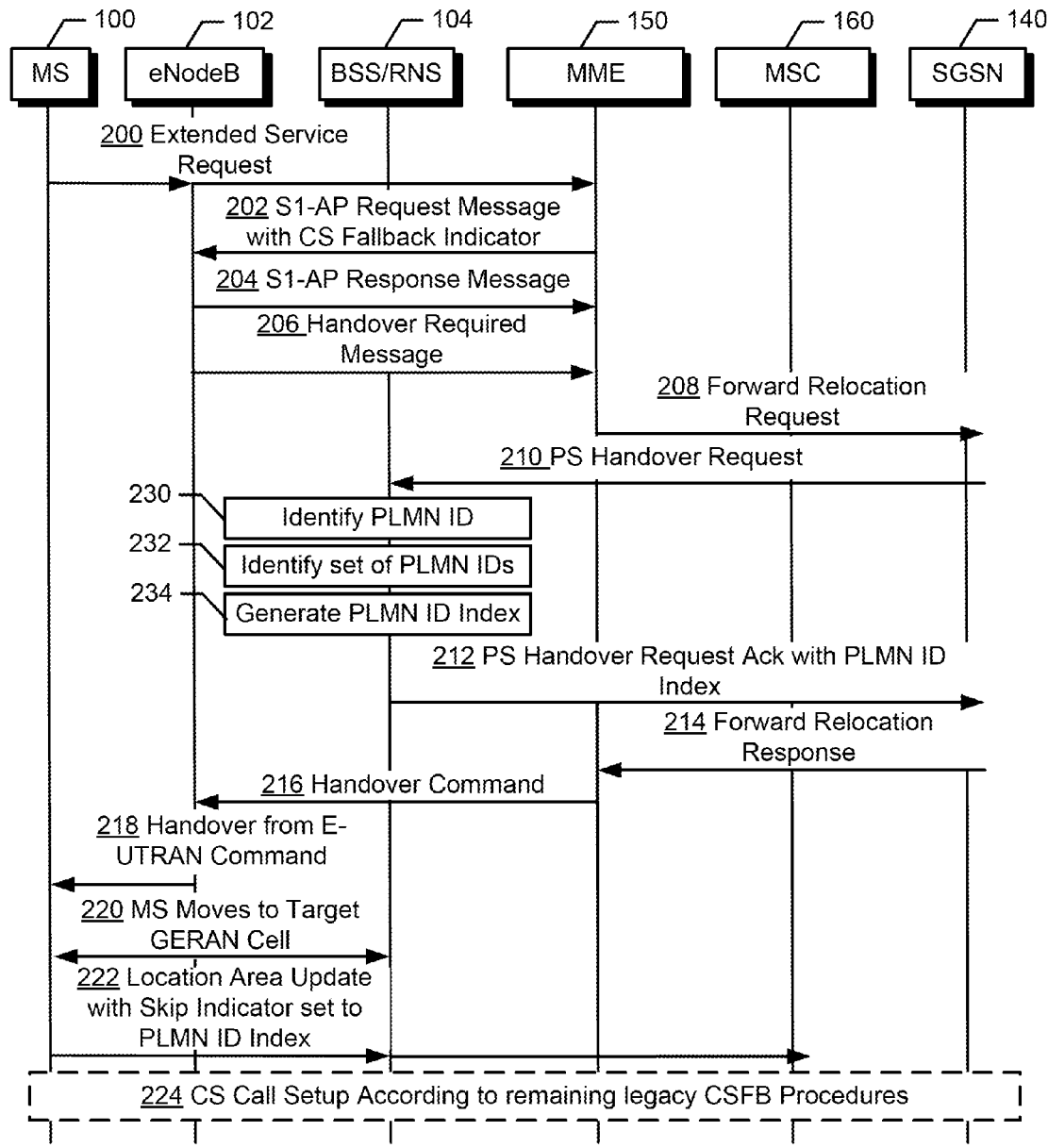
FIG. 2 illustrates a diagram of operations, methods and associated message flows between various network nodes of the radio telecommunications network of FIG. 1 for controlling Packet Switched (PS) handover based CSFB of a MS from an E-UTRAN serving cell to a target UTRAN cell or a target GERAN cell in a PS domain according to some embodiments.

Referring to step 200 of FIG. 2, the MS 100 is operating in, and serviced by, a source eNodeB 102 of the E-UTRAN serving cell 130. The MS 100 sends an Extended Service Request 200 for mobile originating CS fallback to the source MME 150 (via the eNodeB 102). The UE 100 only transmits this request if it is attached to CS domain (with a combined Evolved Packet System (EPS)/IMSI Attach) and cannot initiate an IMS voice session because, for example, the UE 100 is not IMS registered or IMS voice services are not supported by the serving IP-Connectivity Access Network (IP-CAN), home PLMN or MS 100.

In steps 202-210, the source eNodeB 102 triggers PS handover to the target GERAN cell 120 or the target UTRAN cell 110 by sending a Handover Required message (S1AP Cause, Target System Identifier, Source to Target Transparent Container) to the source MME 150. The source eNodeB 102 selects the target PS handover cell (e.g., among one or a plurality of the target GERAN cells 120 or the target UTRAN cells 110) responsive to the PLMN ID and possibly further responsive to the LAI for CS domain provided by the source MME 150.

More particularly, in step 202 the source MME 150 sends an S1-AP MS Context Modification Request (CS Fallback Indicator, LAI) message to the source eNodeB 102. This message indicates to the source eNodeB 102 that the MS 100 should be moved to UTRAN/GERAN. The registered PLMN for CS domain is identified by the PLMN ID included in the LAI, which is allocated by the source MME 150. In step 204, source eNodeB 102 replies with a S1-AP UE Context Modification Response message, and then communicates, in step 206, a Handover Required Message to the source MME 150.

In step 208, the source MME 150 determines from the "Target System Identifier" IE that the type of handover is IRAT Handover to GERAN/UTRAN. For the case where the target RAT is GERAN the source MME 150 initiates a handover resource allocation procedure by sending a Forward Relocation Request (IMSI, Target Identification (shall be set to "empty"), MM Context, PDN Connections, MME Tunnel Endpoint Identifier for Control Plane, MME Address for Control plane, Source to Target Transparent Container, Packet Flow ID, XID parameters (if available), Target Cell Identification, MS Info Change Reporting Action (if available), CSG Information Reporting Action (if available), UE Time Zone, ISR Supported, RAN Cause, Serving Network) message to the target SGSN 140.

For brevity, various further operations of FIG. 2 are explained in the context of PS handover based CSFB to the GERAN cell 120, although similar operations can be performed for CSFB to the UTRAN cell 110. Accordingly, these and other embodiments are not necessarily limited to PS handover based CSFB to a GERAN cell.

In step 210, the target SGSN 140 requests a target BSS 104 of the GERAN cell 120 to establish the necessary resources (PFCs) by sending the message PS Handover Request (Local TLLI, IMSI, Cause, Target Cell Identifier, PFCs to be set-up list, Source BSS to Target BSS Transparent Container and NAS container for handover). It is noted that if the PS handover based CSFB were to a UTRAN cell 110, the target SGSN 140 would send a handover request message to a target Radio Network Subsystem (RNS) 104.

The target BSS 104 allocates the requested resources and communicates (step 212) the applicable parameters to the target SGSN 140 in the message PS Handover Request Acknowledge (Local TLLI, List of set-up PFCs, Target BSS to Source BSS Transparent Container, Cause). The target BSS 104 contains information informing that FULL-MOCN operation is supported, and thereby determines that PLMN ID Index information may be required by the MS 100 when the MS 100 arrives in the target GERAN cell 120 as a result of a PS Handover from the E-UTRAN serving cell 130 to the target GERAN cell 120.

The target BSS 104 identifies (step 230) the PLMN ID associated with the target SGSN 140 from which it receives the PS Handover Request (i.e. the target (selected) PLMN ID) and further identifies (step 232) a set of a plurality of PLMN IDs transmitted as part of system information (SI) in the target GERAN cell 120, and is configured to generate therefrom (step 234) a "PLMN ID Index" corresponding to the target PLMN ID. In step 212, the target BSS 104 communicates the generated PLMN ID Index as part of a PS Handover Request Ack message to the target SGSN 140.

In one embodiment, the target BSS 104 is configured to determine (generate) the PLMN ID index to indicate an association between the PLMN ID associated with the SGSN 140 and one of the PLMN IDs of the set. In a further embodiment, the set of the PLMN IDs comprises an ordered list of PLMN IDs, and the target BSS 104 determines (generates) the PLMN ID index in response to the location of the PLMN ID associated with the SGSN in the ordered list of PLMN IDs. For example, when the target PLMN ID is the third PLMN ID occurring in the list of PLMN IDs transmitted as part of System Information (SI) in the target cell, the target BSS 104 sets the PLMN ID Index to 3.

It is noted that when a GWCN (Gateway Core Network) architecture is used in which SGSNs and MSCs are shared by multiple PLMNs, the SGSN 140 indicates the target (selected) PLMN ID in a new Information Element in the PS Handover Request message sent to the target BSS in step 210. The target BSS 104 contains information identifying the set of PLMN IDs transmitted as part of SI in the target cell, and is configured to determine (generate) a "PLMN ID Index" corresponding to the target PLMN ID.

The target BSS 104 includes (embeds) the "PLMN ID Index" as new information within the "Target BSS to Source BSS Transparent Container" message that is communicated to the target SGSN 140 in the PS Handover Request Ack message 212. The container is part of the Radio Network information (see section 5.6.1.8.2 of 3GPP TS 43.129) carried by "Target BSS to Source BSS Transparent Container" and is sent transparently to the MS 100 (i.e. the source eNodeB 102 passes this information directly to the MS 100 as part of the PS Handover procedure).

In step 214, the target SGSN 140 sends (e.g., forwards) the message Forward Relocation Response (Cause, SGSN Tunnel Endpoint Identifier for Control Plane, SGSN Address for Control Plane, Target to Source Transparent Container, RAN Cause, List of set-up PFIs, Address(es) and TEID(s) for User Traffic Data Forwarding, Serving GW change indication) to the source MME 150. The Target to Source Transparent Container includes the PLMN ID Index carried within the Target BSS to Source BSS Transparent Container received from the target BSS 104.

In step 216, the source MME 150 performs further PS Handover preparation and sends the message Handover Command (Target to Source Transparent Container (PS Handover Command with RN part and EPC part), E-RABs to Release List, Bearers Subject to Data Forwarding List), SLAP Cause) to the source eNodeB 102. The Handover Command message includes the PLMN ID Index.

In Step 218, the source eNodeB sends to the MS 100 a command message to handover to the Target Access System via the message "HO from E-UTRAN Command" The command message includes a transparent container including Radio Network information (see step 212) that the target BSS 104 has constructed in the preparation phase. The command message includes the PLMN ID Index.

In step 220, the MS 100 executes the handover according to the parameters provided in the "HO from E-UTRAN Command" it received in step 218 and thereby moves to the target BSS 104.

In step 222, the MS 100 arrives in the GERAN cell 120, completes the handover execution phase, and if the LA of the target cell is different from the one stored in the MS 100, the MS 100 responds by initiating a Location Area Update or a Combined RA/LA Update procedure. If the network is operating in NMO-I (Network Mode of Operation I), the MS 100 may initiate a separate Location Area Update (LAU) before initiating the RAU procedure instead of a Combined RA/LA Update procedure (to speed up the PS handover based CSFB procedure). Alternatively, if the network is operating in NMO-II or NMO-III, the MS 100 initiates a Location Area Update before initiating the RAU procedure required for PS handover.

In accordance with various embodiments, in step 222, the MS 100 embeds the PLMN ID Index, which was received as part of the "HO from E-UTRAN Command" in step 218, into the LAU message that is transmitted to the target BSS 104. In a further embodiment, the MS 100 embeds the PLMN ID Index in a "Skip Indicator" IE of the LAU message that it transmits to the target BSS 104.

The target BSS 104 identifies the PLMN ID Index received with the LAU message, such as by looking at a value of the Skip Indicator IE of the LAU message, and determines therefrom which MSC is to be associated with the MS 100. The target BSS 104 may forward the LAU message to a MSC 160 that is identified by the PLMN ID index of the LAU message. The MS 100, the BSS 104, and the MSC 160 can then perform further operations to complete CS call setup, step 224, which may occur according to known 3GPP standards processes.

Related Operations and Methods by a Radio Telecommunications Network for Controlling PS handover based CSFB FIGS. 3-10 illustrate flowcharts of related operations and methods by a radio telecommunications network according to some related embodiments. The operations and methods may be performed by, for example, a BSS, a RNS, a MME, a SGSN, and/or a MSC.

Figure 3:
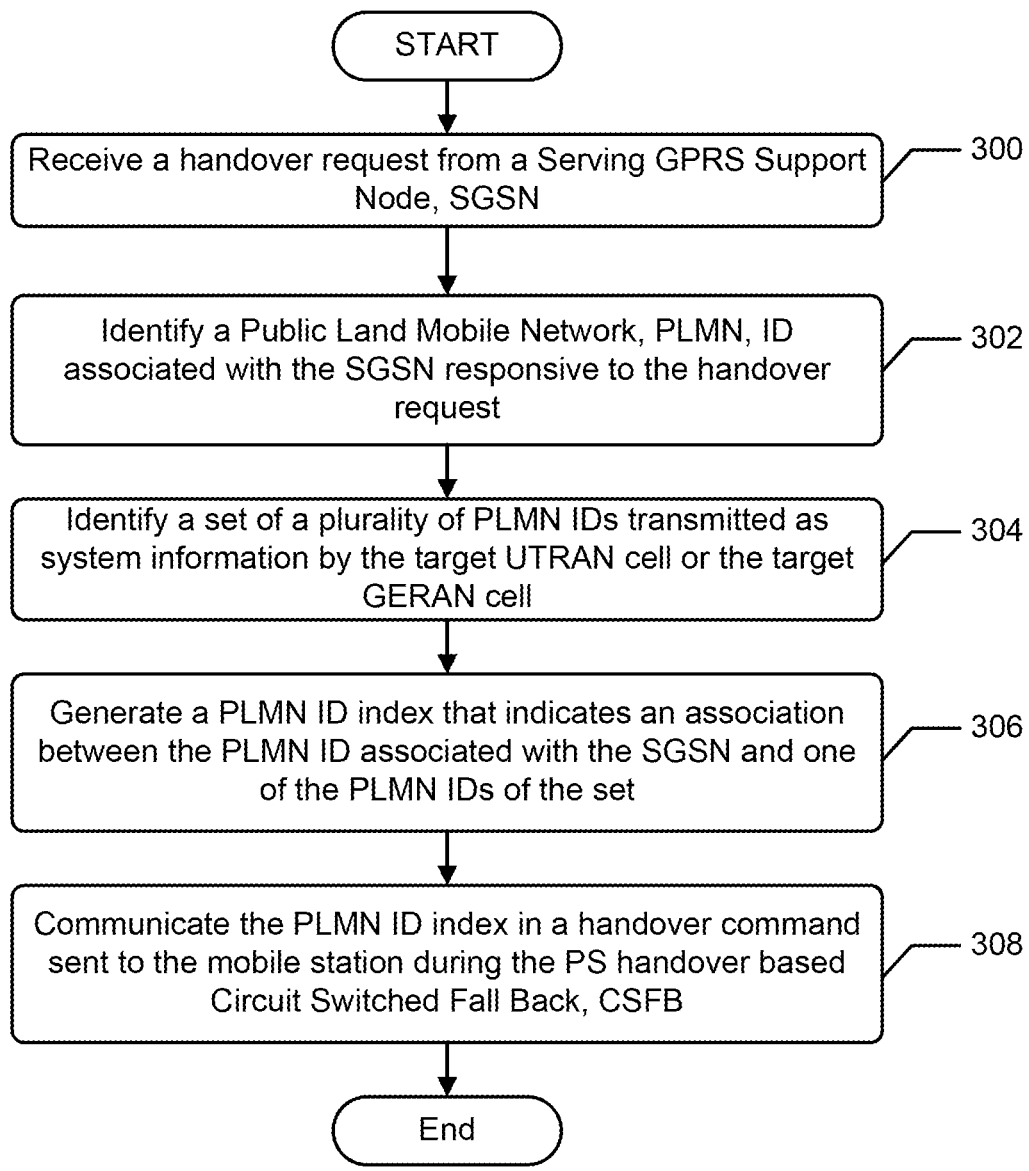
FIGS. 3-10 illustrate flowcharts of related operations and methods by a radio telecommunications network according to some embodiments.

FIG. 3 illustrates operations and methods by the radio telecommunications network for controlling PS handover based CSFB of a MS from a E-UTRAN serving cell to a target UTRAN cell or a target GERAN cell in a PS domain. A handover request is received (step 300) from a SGSN. The handover request may be a PS handover request. A PLMN ID associated with the SGSN is identified (step 302) responsive to the handover request. A set of a plurality of PLMN IDs transmitted as system information by the target UTRAN cell or the target GERAN cell is identified (step 304). The set of the PLMN IDs can include PLMN IDs of a plurality of different operators of a FULL-Multi-Operator Core Network (FULL-MOCN). A PLMN ID index is generated (step 306) that indicates an association between the PLMN ID associated with the SGSN and one of the PLMN IDs of the set. The PLMN ID index is communicated (step 308) in a handover command sent to the MS during the PS handover based CSFB.

Figure 4:
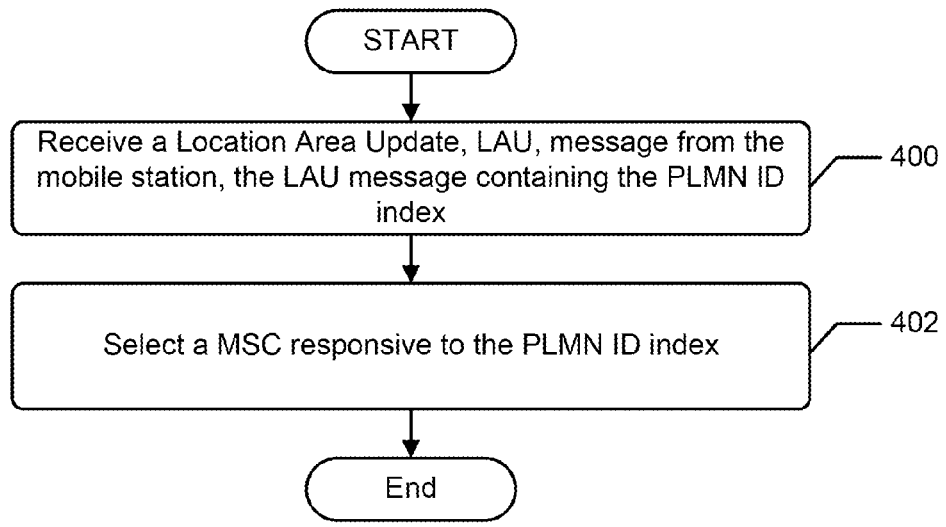

In a related embodiment of FIG. 4, a Location Area Update (LAU) message is received (step 400) from the MS. The LAU message contains the PLMN ID index. A MSC 160 is selected (step 402) responsive to the PLMN ID index.

Figure 5:
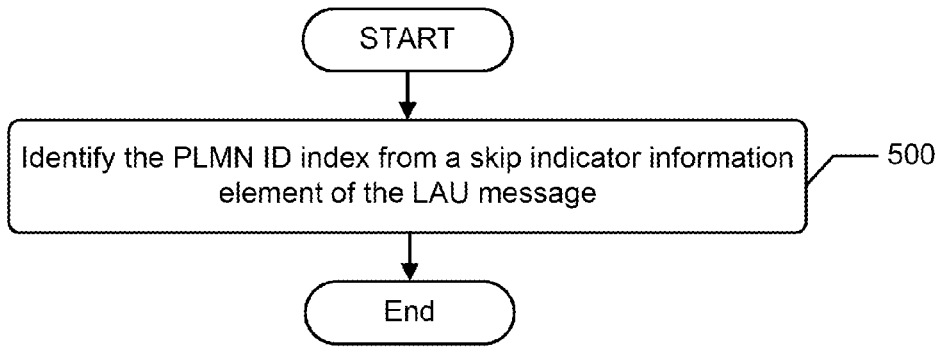

FIG. 5 is a related embodiment to FIG. 4, in which the PLMN ID index is identified (step 500) from a skip indicator information element of the LAU message.

Figure 6:
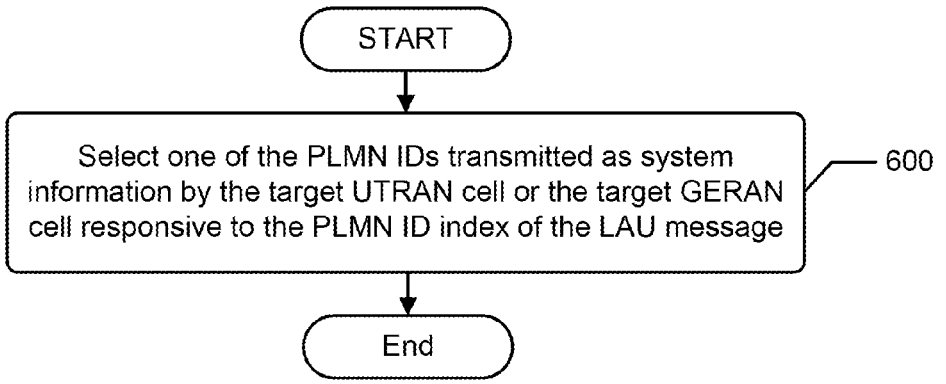

FIG. 6 is a related embodiment to FIG. 4, in which selection (step 402) of a MSC 160 includes selecting (step 600) one of the PLMN IDs transmitted as system information by the target UTRAN cell or the target GERAN cell responsive to the PLMN ID index of the LAU message.

Figure 7:
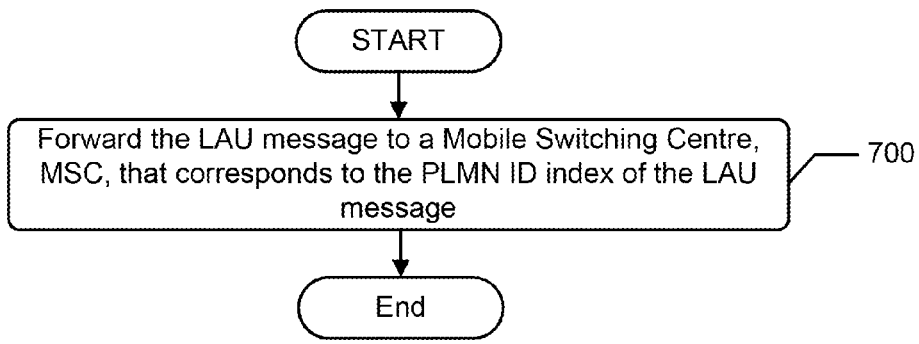

FIG. 7 is a related embodiment to FIG. 4, in which the LAU message is forwarded (step 700) to a Mobile Switching Centre, MSC, that corresponds to the PLMN ID index of the LAU message.

Figure 8:
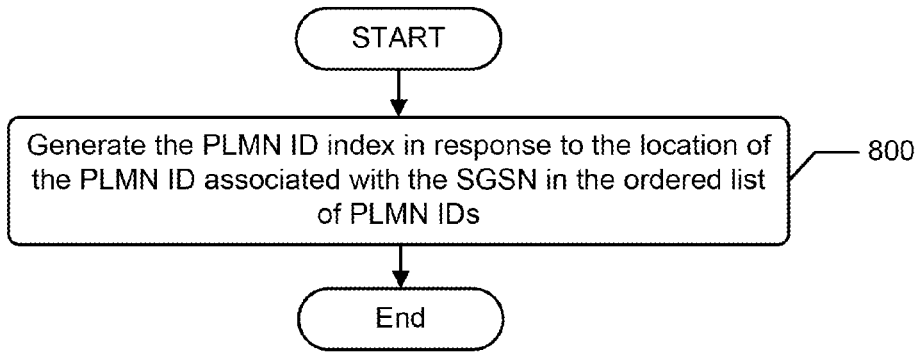

FIG. 8 is a related embodiment to FIG. 1, where the set of the PLMN IDs (step 304) can include an ordered list of PLMN IDs. The PLMN ID index can be generated (800) in response to the location of the PLMN ID associated with the SGSN in the ordered list of PLMN IDs.

Figure 9:
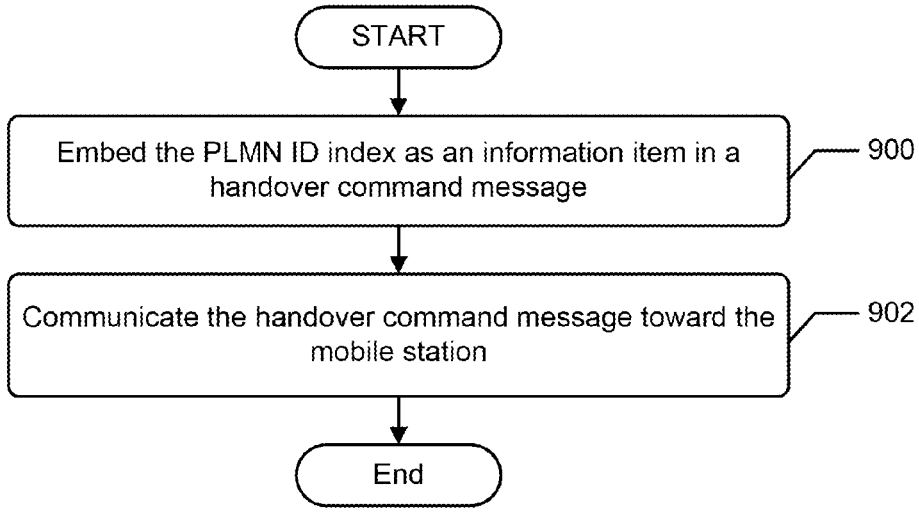

FIG. 9 is a related embodiment to FIG. 8, where communication (step 308) of the PLMN ID index toward the MS for use during PS handover based CSFB, can include embedding (step 900) the PLMN ID index as an information item in a handover command message. The handover command message is communicated (step 902) toward the MS.

Figure 10:
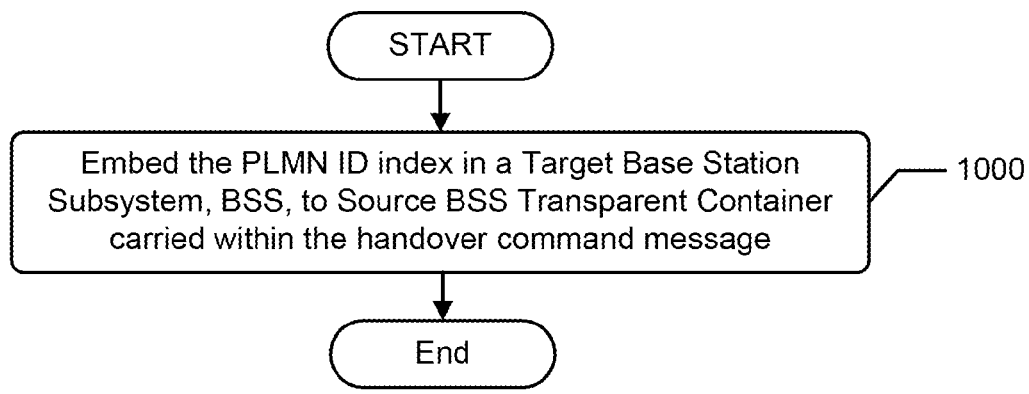

FIG. 10 is a related embodiment to FIG. 1, where embedding (step 900) the PLMN ID index as an information element in a handover command message can include embedding (step 1000) the PLMN ID index in a Target BSS to Source BSS Transparent Container carried within the handover command message.

Related Operations and Methods by a Mobile Station

Figure 11:
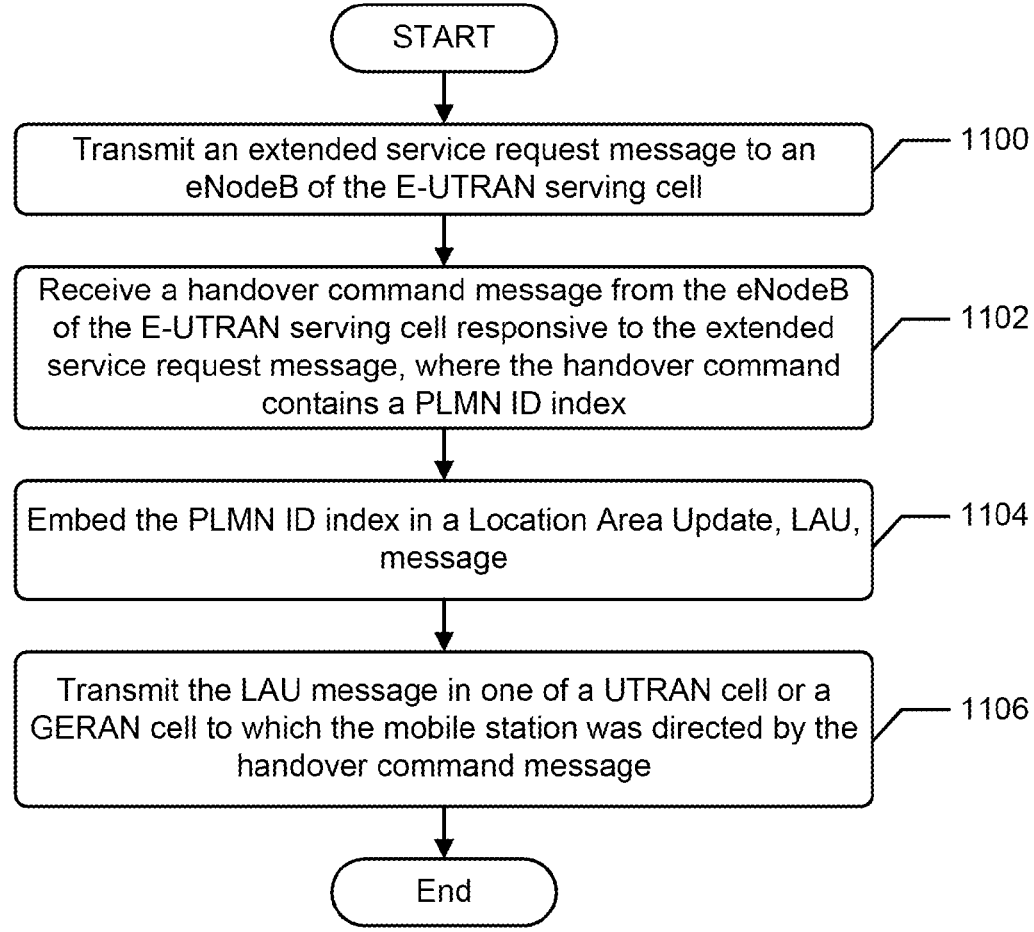
FIGS. 11-13 illustrate flowcharts of related operations and methods by a MS according to some embodiments; and, FIG. 14 is a block diagram of an example network node or MS of FIGS. 1 and 2 that is configured according to some embodiments.
Figure 12:
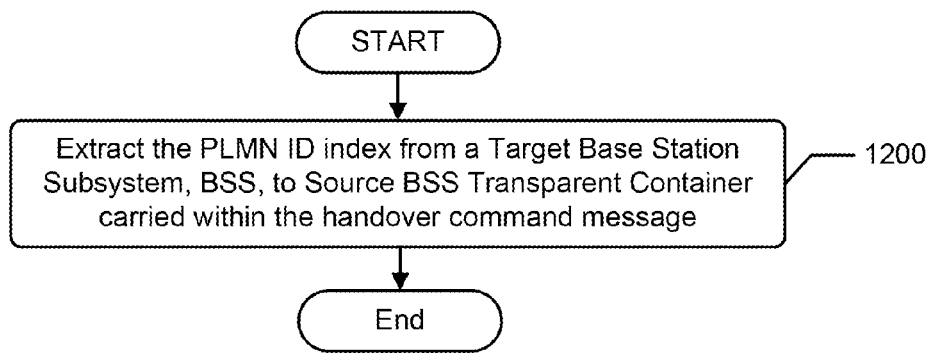
Figure 13:
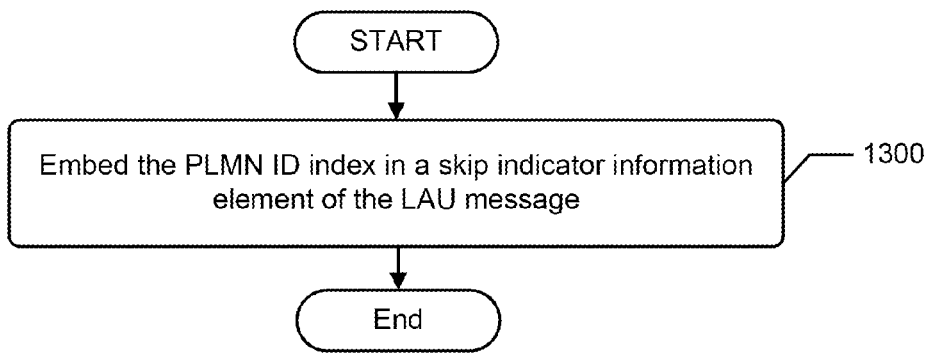

FIGS. 11-13 illustrate flowcharts of related operations and methods by a MS according to some related embodiments.

FIG. 11 illustrates operations and methods by the MS for controlling PS handover based CSFB of the MS from a E-UTRAN serving cell to a target UTRAN cell or a target GERAN cell in a CS domain. Referring to FIG. 11, an extended service request message is transmitted (step 1100) to an eNodeB of the E-UTRAN serving cell. A handover command message is received (step 1102) from the eNodeB of the E-UTRAN serving cell responsive to the extended service request message, where the handover command contains a PLMN ID index. After completing the handover execution phase of a PS handover based CSFB, the mobile station establishes a CS connection and determines that a LAU update is required. The PLMN ID index is embedded (step 1104) in a Location Area Update (LAU) message. The LAU message is transmitted (step 1106), with the PLMN ID index, in one of the UTRAN cell or the GERAN cell to which the mobile station was directed by the handover command message. The PLMN ID index can identify a PLMN ID of one of a plurality of different operators of a FULL-Multi-Operator Core Network (FULL-MOCN).

FIG. 12 is a related embodiment to FIG. 11, where receiving (step 1102) the handover command message from the eNodeB of the E-UTRAN serving cell can include extracting (step 1200) the PLMN ID index from a transparent container carried within the handover command message, which can be a Target BSS to Source BSS Transparent Container.

FIG. 13 is a related embodiment to FIG. 11, where embedding (step 1104) the PLMN ID index in the LAU message can include embedding (step 1300) the PLMN ID index in a skip indicator information element of the LAU message.

Example Network Node/Mobile Station

Figure 14:
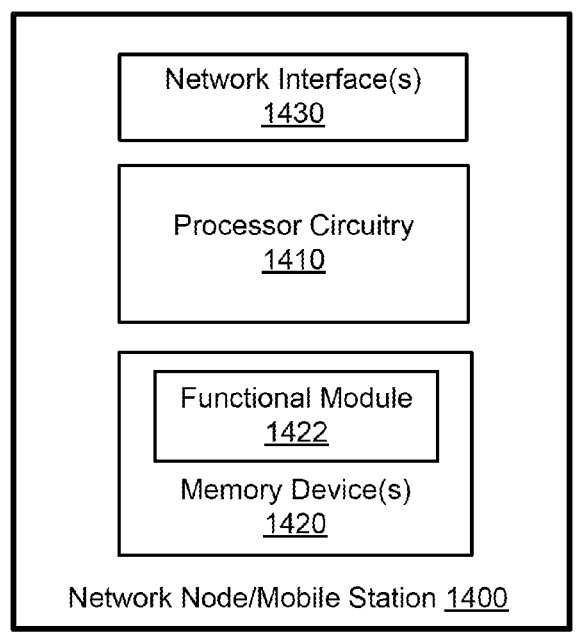

FIG. 14 is a block diagram of a network node or mobile station 1400 that is configured according to some embodiments. The network node or mobile station 1400 may be used as one or more of the elements of FIGS. 1 and 2, including, but not limited to, the MS 100, eNodeB 102, the BSS/RNS 104, the MME 150, the MSC 160, or the SGSN 150. The network node or mobile station 1400 can include one or more network interfaces 1430, processor circuitry 1410, and memory devices 1420 that contain functional modules 1422.

The processor circuitry 1410 may include one or more data processing circuits, such as a general purpose and/or special purpose processor (e.g., microprocessor and/or digital signal processor) that may be collocated or distributed across one or more networks. The processor circuitry 1410 is configured to execute computer program instructions from the functional modules 1422 in the memory devices 1420, described below as a computer readable medium, to perform some or all of the operations and methods that are described above for one or more of the embodiments, such as the embodiments of FIGS. 1-13. Accordingly, the processor circuitry 1410 can be configured by execution of the computer program instructions in the functional modules 1422 to carry out at least some of the functionality described herein to control PS handover based CSFB of a mobile station from an E-UTRAN serving cell to a target UTRAN cell or a target GERAN cell in a PS domain.

ABBREVIATIONS

A list of abbreviations used in the present disclosure is provided below for ease of reference of the reader:
  3GPP Third Generation Partnership Project
  BSC Base Station Controller
  BSS Base Station Subsystem
  CS Circuit Switched
  CSFB Circuit Switched Fall Back
  EDGE Enhanced Data rates for GSM Evolution
  E-UTRAN Evolved Universal Terrestrial Radio Access Network
  eNodeB E-UTRAN NodeB
  FULL-MOCN FULL-Multi-Operator Core Network
  GERAN GSM EDGE Radio Access Network
  GPRS General Packet Radio Service
  GWCN Gateway Core Network
  IE Information Element
  IMS IP Multimedia Subsystem
  LAU Location Area Update
  MME Mobility Management Entity
  MS Mobile Station
  MSC Mobile Switching Centre
  PLMN Public Land Mobile Network
  PS Packet Switched
  RNC Radio Network Controller
  RNS Radio Network Subsystem
  SGSN Serving GPRS Support Node
  SGW Serving Gateway
  SI System Information
  UMTS Universal Mobile Telecommunications System
  UTRAN UMTS Terrestrial Radio Access Network Further Definitions and Embodiments In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method in a radio telecommunications network for controlling Packet Switched (PS) handover based Circuit Switched Fall Back, CSFB, of a mobile station from an Evolved Universal Terrestrial Radio Access Network, E-UTRAN, serving cell to a target Universal Terrestrial Radio Access Network, UTRAN, cell or a target GSM EDGE Radio Access Network, GERAN, cell in a PS domain, the method comprising the steps of:
   receiving a handover request from a Serving GPRS Support Node, SGSN;
   identifying a Public Land Mobile Network, PLMN, ID associated with the SGSN responsive to the handover request;
   identifying a set of a plurality of PLMN IDs transmitted as system information by the target UTRAN cell or the target GERAN cell;
   generating a PLMN ID index that indicates an association between the PLMN ID associated with the SGSN and one of the PLMN IDs of the set; and
   communicating the PLMN ID index in a handover command sent to the mobile station during the PS handover based CSFB.

2. The method of claim 1, further comprising the steps of:
   receiving a Location Area Update, LAU, message from the mobile station, the LAU message containing the PLMN ID index; and
   selecting a Mobile Switching Centre, MSC, responsive to the PLMN ID index.

3. The method of claim 2, further comprising the step of:
identifying the PLMN ID index from a skip indicator information element of the LAU message.

4. The method of claim 2, wherein the step of selecting a MSC responsive to the PLMN ID index, comprises the step of:
selecting one of the PLMN IDs transmitted as system information by the target UTRAN cell or the target GERAN cell responsive to the PLMN ID index of the LAU message.

5. The method of claim 2, further comprising the step of:
forwarding the LAU message to a MSC that corresponds to the PLMN ID index of the LAU message.

6. The method of claim 1, wherein the handover request is a Packet Switched, PS, handover request.

7. The method of claim 1, wherein:
the set of the plurality of PLMN IDs comprises an ordered list of PLMN IDs; and
the step of generating a PLMN ID index that indicates an association between the PLMN ID associated with the SGSN and one of the PLMN IDs of the set, comprises the step of generating the PLMN ID index in response to the location of the PLMN ID associated with the SGSN in the ordered list of PLMN IDs.

8. The method of claim 1, wherein the set of the plurality of PLMN IDs comprises PLMN IDs of a plurality of different operators of a FULL-Multi-Operator Core Network, FULL-MOCN.

9. The method of claim 1, wherein the step of communicating the PLMN ID index toward the mobile station for use during the PS handover based CSFB comprises the steps of:
embedding the PLMN ID index as an information element in a handover command message; and
communicating the handover command message toward the mobile station.

10. The method of claim 9, wherein the step of embedding the PLMN ID index as an information element in a handover command message comprises the step of:
embedding the PLMN ID index in a Target to Source Transparent Container carried within the handover command message.

11. The method of claim 1, wherein the radio telecommunications network comprises a Base Station Subsystem, BSS, or a Radio Network Subsystem, RNS.

12. A method by a mobile station for controlling Packet Switched (PS) handover based Circuit Switched Fall Back, CSFB, of the mobile station from an Evolved Universal Terrestrial Radio Access Network, E-UTRAN, serving cell to a target Universal Terrestrial Radio Access Network, UTRAN, cell or a target GSM EDGE Radio Access Network, GERAN, cell in a PS domain, the method comprising the steps of:
transmitting an extended service request message to an eNodeB of the E-UTRAN serving cell, wherein PS handover based CSFB is triggered responsive to the extended service request message;
receiving, during the PS handover based CSFB, a handover command message from the eNodeB of the E-UTRAN serving cell, wherein the handover command message contains a PLMN ID index;
extracting the PLMN ID index from a Target to Source Transparent Container carried within the handover command message;
embedding the PLMN ID index in a Location Area Update, LAU, message; and
transmitting the LAU message in one of the target UTRAN cell or the target GERAN cell to which the mobile station was directed by the handover command message.

13. The method of claim 12, wherein the PLMN ID index identifies a PLMN ID of one of a plurality of different operators of a FULL-Multi-Operator Core Network, FULL-MOCN.

14. The method of claim 12, wherein the step of embedding the PLMN ID index in a Location Area Update, LAU, message comprises the step of:
embedding the PLMN ID index in a skip indicator information element of the LAU message.

15. A network node for controlling Packet Switched (PS) handover based Circuit Switched Fall Back, CSFB, of a mobile station from an Evolved Universal Terrestrial Radio Access Network, E-UTRAN, serving cell to a target Universal Terrestrial Radio Access Network, UTRAN, cell or a target GSM EDGE Radio Access Network, GERAN, cell in a PS domain, the network node comprising:
at least one processor; and
at least one memory coupled to the at least one processor and comprising computer readable program code that when executed by the at least one processor causes the at least one processor to perform operations comprising:
receiving a handover request from a Serving GPRS Support Node, SGSN;
identifying a Public Land Mobile Network, PLMN, ID associated with the SGSN responsive to the handover request;
identifying a set of a plurality of PLMN IDs transmitted as system information by the target UTRAN cell or the target GERAN cell;
generating a PLMN ID index that indicates an association between the PLMN ID associated with the SGSN and one of the PLMN IDs of the set; and
communicating the PLMN ID index toward the mobile station for use during the PS handover based CSFB.

16. The network node of claim 15, wherein the operations further comprise:
receiving a Location Area Update, LAU, message from the mobile station, the LAU message containing the PLMN ID index; and
selecting a Mobile Switching Centre, MSC, responsive to the PLMN ID index.

17. The network node of claim 16, wherein the operations further comprise:
identifying the PLMN ID index from a skip indicator information element of the LAU message.

18. The network node of claim 16, wherein the operations further comprise:
selecting one of the PLMN IDs transmitted as system information by the target UTRAN cell or the target GERAN cell responsive to the PLMN ID index of the LAU message.

19. The network node of claim 16, wherein the operations further comprise:
forwarding the LAU message to a MSC that is identified by the PLMN ID index of the LAU message.

20. The network node of claim 15, wherein:
the set of the plurality of PLMN IDs comprises an ordered list of PLMN IDs; and
the operations further comprise generating the PLMN ID index in response to the location of the PLMN ID associated with the SGSN in the ordered list of PLMN IDs.

21. The network node of claim 15, wherein the operations further comprise:
embedding the PLMN ID index in a Target to Source Transparent Container carried within the handover command message; and communicating the handover command message toward the mobile station.

22. The network node of claim 15, further comprising circuitry of a Base Station Subsystem, BSS, or a Radio Network Subsystem, RNS.

23. A mobile station for controlling Packet Switched (PS) handover based Circuit Switched Fall Back, CSFB, of the mobile station from an Evolved Universal Terrestrial Radio Access Network, E-UTRAN, cell to a target Universal Terrestrial Radio Access Network, UTRAN, serving cell or a target GSM EDGE Radio Access Network, GERAN, cell in a PS domain, the mobile station comprising:
  at least one processor; and
  at least one memory coupled to the at least one processor and comprising computer readable program code that when executed by the at least one processor causes the at least one processor to perform operations comprising:
    transmitting an extended service request message to an eNodeB of the E-UTRAN serving cell, wherein PS handover based CSFB is triggered responsive to the extended service request message;
    receiving, during the PS handover based CSFB, a handover command message from the eNodeB of the E-UTRAN serving cell, wherein the handover command message contains a PLMN ID index;
    extracting the PLMN ID index from a Target to Source Transparent Container carried within the handover command message;
    embedding the PLMN ID index in a Location Area Update, LAU, message; and
    transmitting the LAU message in one of the UTRAN cell or the GERAN cell to which the mobile station was directed by the handover command message.

24. The mobile station of claim 23, wherein embedding the PLMN ID index in the LAU message further comprises embedding the PLMN ID index in a skip indicator information element of the LAU message.

* * * * *